(12) United States Patent
Pascucci

(10) Patent No.: US 7,979,994 B2
(45) Date of Patent: Jul. 19, 2011

(54) ULTRAVIOLET RISK INDICATOR

(76) Inventor: Alberto Luis Pascucci, Buenos Aires (AR)

( * ) Notice: Subject to any disclaimer, the term of this patent is extended or adjusted under 35 U.S.C. 154(b) by 0 days.

(21) Appl. No.: 12/763,054

(22) Filed: Apr. 19, 2010

(65) Prior Publication Data

US 2011/0100288 A1    May 5, 2011

(30) Foreign Application Priority Data

Apr. 24, 2009    (AR) .............................. P2009-0101476

(51) Int. Cl.
*G04B 45/02*    (2006.01)
(52) U.S. Cl. .......................................................... 33/270
(58) Field of Classification Search ................... 33/268, 33/269, 270, 271
See application file for complete search history.

(56) References Cited

U.S. PATENT DOCUMENTS

| | | | | |
|---|---|---|---|---|
| 747,046 | A | * | 12/1903 | Cowdrey ........................ 33/270 |
| 5,018,531 | A | * | 5/1991 | Hartman ........................ 33/483 |
| 6,810,594 | B2 | * | 11/2004 | Lucarini et al. ................ 33/270 |
| 2004/0078988 | A1 | * | 4/2004 | Lucarini et al. ................ 33/270 |
| 2004/0098871 | A1 | * | 5/2004 | Waltho ............................ 33/270 |
| 2007/0214665 | A1 | * | 9/2007 | Courter .......................... 33/270 |
| 2009/0044417 | A1 | * | 2/2009 | Chen .............................. 33/269 |

* cited by examiner

*Primary Examiner* — G. Bradley Bennett
(74) *Attorney, Agent, or Firm* — Neifeld IP Law, PC

(57) ABSTRACT

An ultraviolet risk indicator instrument comprising a dial and a shadow projection device on it, the dial having colored areas that indicate different UV risks, defined by lines of declination (solstices and equinoxes) and solar hour lines calculated based on the transformation of the Hour Coordinates of the Sun (Hour Angle and Declination) in a 3D Cartesian Coordinate System, whose origin is the tip of the shadow projection device (being a polar style parallel to the rotation axis of the Earth, or a straight style perpendicular to the dial plane) using matrix calculations to produce the necessary rotations of the system, taking into account the latitude of the place, the declination and inclination of the dial. The style may be a rod or a triangular shape. The tip of the style is the focus or point of view of a gnomonic projection, where the Sun is the "point" of space to be projected, the dial is the projection plane and the projected point is the shadow point, whose coordinates (x,y) in the dial plane are calculated. Hour lines for local solar time in the dial are calculated, converging to the intersection of a polar style with the dial, the lines of declination of solstices and equinoxes and the position on the dial plane of the shadow cast by the tip of the style. The shadow point moves according to the annual and diurnal variation of the altitude of the Sun crossing different sectors of the dial.

9 Claims, 11 Drawing Sheets

ULTRAVIOLET RISK INDICATOR

RELATED APPLICATION

This application claims benefit from Argentina application No. P2009-0101476, filed Apr. 24, 2009, which is incorporated herein by reference.

FIELD OF THE INVENTION

A warning device about damage to human health that may result from exposure to UV radiation of the solar spectrum. The invention indicates the degree of risk from solar UV radiation by means of a graphic display in real time, used by identifying the color of an area indicated by the shadow cast of a style (polar or straight) to take appropriate sun protection. The device is useful as a warning sign at beaches, swimming pools, ski slopes and anywhere outdoors.

BACKGROUND OF THE INVENTION

The ULTRAVIOLET RISK INDICATOR (UVRI) is intended to warn people about the damage to human health which may result from exposure to UV radiation of the solar spectrum, depending on the altitude of the sun in the sky and its relationship with the intensity of UV radiation at a particular place and time. UV solar radiation also depends on other factors, such as the stratospheric ozone layer, the presence of clouds, latitude of the place, elevation above sea level, and reflection of solar radiation from the surface of Earth. The instrument basically consists of a dial with a shadow projection device on it (a polar or straight stylus). The polar stylus is parallel to the Earth's axis of rotation. The straight stylus is perpendicular to the dial and shows areas of different colors indicating different degrees of UV risk. The dial is defined by lines of declination (solstices or equinoxes) and solar hour lines calculated on the basis of the transformation of Solar Hour Coordinates (Hour Angle and Declination) in the 3D Cartesian Coordinates System, whose origin is the tip of the stylus (polar or straight), using a matrix calculation to produce rotations of the coordinate system that take into account the latitude of the place, declination (orientation) and inclination of the dial. In general, the style is a rod or triangular shape, whose parameters are calculated, the tip of the style is the projection focus or point of view of a gnomonic projection, where the "point" of space to be projected is the sun. The dial is the plane projection, and the point projected is the "shadow point". The coordinates of the shadow point (x,y) of an orthogonal coordinate system located in the plane of the dial are calculated.

Apart from the hour lines of the local solar time, which will be concurrent to the so-called center of the dial, the declination lines of the solstices and equinoxes and the location on the dial plane of the shadow projected by the end of the projection device (polar or perpendicular) are calculated, which moves according to the annual and diurnal variation of the altitude of the sun crossing different sectors of the dial, with different colors indicating the degree of risk of UV radiation at the instant of the observation.

There are no known instruments like the UV RISK INDICATOR for the purpose of providing information in real time in situ about the solar UV radiation risk, in a simple form and which is available to any observer, even a child, since normally the operation, reading and interpretation of data from radiometers, spectroradiometers and dosimeter instruments for measuring the intensity of solar or UV radiation is reserved for qualified technicians. There are also organizations in different countries, usually meteorological services that report the UV Index based on measurements with spectroradiometers or broadband detectors. For prediction of a UV Index a radiative transfer model is required with input of total ozone from ground-based spectroradiometers or from satellites, and the aerosol optical properties. According to the country, this type of warning is not always taken into account by people when they are gauging appropriate sun protection, and there is a general lack of knowledge about the critical values of UV radiation.

1.1. Extraterrestrial Radiation

The solar radiation incidence outside the atmosphere of the Earth is the extraterrestrial radiation (FIGS. 1 and 2).

$Io = 1367 * (Rm/R)2$ W/m2

Io extraterrestrial irradiance (FIG. 2)
Rm mean distance Sun-Earth
R actual distance Sun-Earth
An approximate equation (Rm/R)2 is:

$(Rm/R)2 = 1.00011$ $+0.034221 * \cos$ $+0.001280 * \sin$ $+0.000719 * \cos(2*\beta) +$ $0.000077 * \sin(2*\beta)$ $\beta = 2 * pi * n / 365$ radians n day of the year The Earth has an elliptical orbit around the sun that is located in one focus of the ellipse (Kepler's 1st Law). The maximum value of extraterrestrial irradiance (1414.9 W/m2) occurs each year on the perihelion, in early January, when the distance Earth-Sun is minimal. The minimum irradiance (1321.3 W/m2) is reached on the aphelion, in early July, when the distance Earth-Sun is at its maximum point. The average value of extraterrestrial irradiance is 1367.1 W/m2.

The highest values of extraterrestrial radiation coincide with the summer in the Southern Hemisphere (winter in the Northern Hemisphere). The lowest values occur when it is winter in the Southern Hemisphere (summer in the Northern Hemisphere).

1.2. Electromagnetic Spectrum

| Radiation Type | Wavelength (nm) | Energy (%) |
| --- | --- | --- |
| Infrared | >700 | 49.4 |
| Visible | 400-700 | 42.3 |
| UVA | 400-320 | 6.3 |
| UVB | 320-290 | 1.5 |
| UVC | <290 | 0.5 |
| Total | | 100.0 |

The table above shows the distribution of solar irradiance energy. The ultraviolet radiation can be subdivided into UVA, UVB and UVC and is a specific part of the spectrum, which represents only 8.3% of total energy. Most of the radiation is in the visible and infrared zone (FIG. 3).

The UVA radiation includes the wavelength range between 320 and 400 nm and it is absorbed to a small extent by the ozone layer in the stratosphere of the Earth. The UVB radiation, with wavelengths between 290 and 320 nm, is mostly absorbed by the stratospheric ozone. The UVC radiation is characterized by wavelengths shorter than 290 nm and it is completely absorbed by the ozone.

The radiation reaching the Earth is largely composed by UVA and a small amount of UVB radiation. This is the part of the spectrum that may affect human beings if they are exposed for a long time to sunlight.

1.3. UV Index

The UV Index is a daily forecast of the amount of skin damaging UV radiation which is expected to reach the surface of the Earth when the altitude of the Sun at its maximum point in the sky.

The amount of UV radiation reaching surface of the Earth is mainly influenced by the altitude of the Sun above the horizon of a place, the ozone levels in the stratosphere and the cloud cover. The UV Index ranges from 0 at night hours to 15 or 16 on the tropics and high places under clear skies.

1.4. Diurnal Variability of UV Radiation

FIG. 4 shows Diurnal Variation of Ultraviolet Radiation Erithemal Dose Rate mW/m2 (ordinates), Local Solar Time (abscissas)

The UV radiation and its likelihood to affect skin are highest when the Sun reaches its maximum altitude in the sky or solar noon (zenith distance z=0), and it decreases rapidly as the Sun approaches the horizon (FIG. 4).

FIG. 5 shows the diurnal variation of UV solar radiation and its likelihood to affect skin for different latitudes in Northern Hemisphere and summer solstice. The UV radiation presents strong variations between 08:00 and 16:00 approximately of local solar time for latitudes 20° N and 40° N, and an attenuated variation for latitude 60° N, with a maximum value at solar noon much higher for the first two. The hour angle ±4 h (±60°) of the Sun corresponds to 16:00 and 08:00 h of true solar time, westward and eastward respectively measured from transit or solar noon.

1.5. UV Radiation and the Altitude of Sun

The amount of ozone crossed by solar radiation depends on the concentration in the atmosphere, the altitude above sea level and the angle of the Sun over the horizon of a place.

The higher the altitude above sea level (mountain) the shorter the path of the radiation in the atmosphere, which therefore results in an increase in the irradiance.

If the sun is low over the horizon (FIG. 6), that is, if there is a large zenith distance, the greater is the path of solar radiation in the atmosphere and the amount of stratospheric ozone that must be crossed is longer, therefore the level of irradiance at this point on the surface of the Earth is lower.

If zenith distance z=0 the Sun is directly above the place (zenith), that situation is only possible for latitudes between 23.44° N and 23.44° S, Tropics of Cancer and Capricorn respectively.

SUMMARY OF THE INVENTION

Insert independent claims . . .

As stated, the main purpose of this invention Patent application is to provide an instrument that, when being installed anywhere outdoor, can show the magnitude of solar ultraviolet risk at all times, that can be accessed by people without knowledge on the subject and that can easily be interpreted just by the mere observation of the position of the shadow of a style (polar or straight) on the dial and the color code of the sector associated to the concerned degree of risk of UV radiation.

DETAILED DESCRIPTION OF THE PREFERRED EMBODIMENTS

Figure 1:
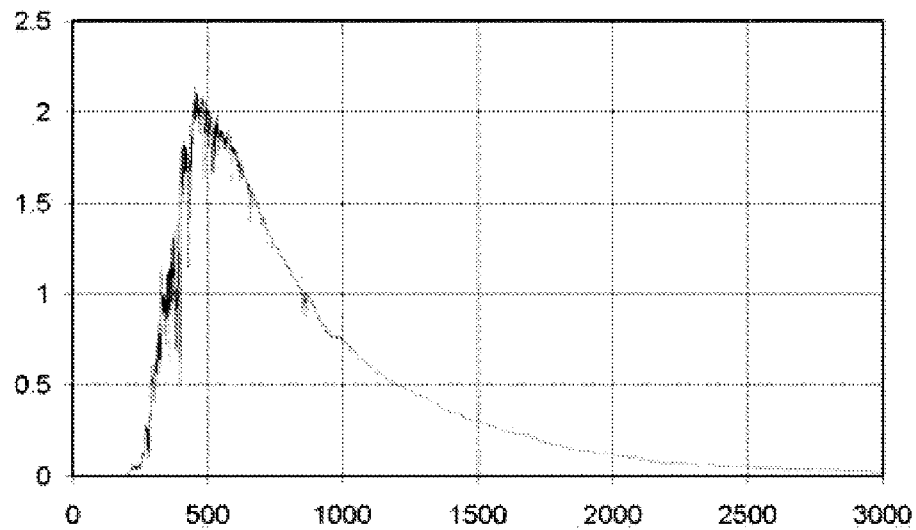
FIG. 1 is a graph showing the Extraterrestrial Solar Spectrum Irradiance W/m2/nm (ordinates), Wavelength nm (abscissas).
Figure 2:
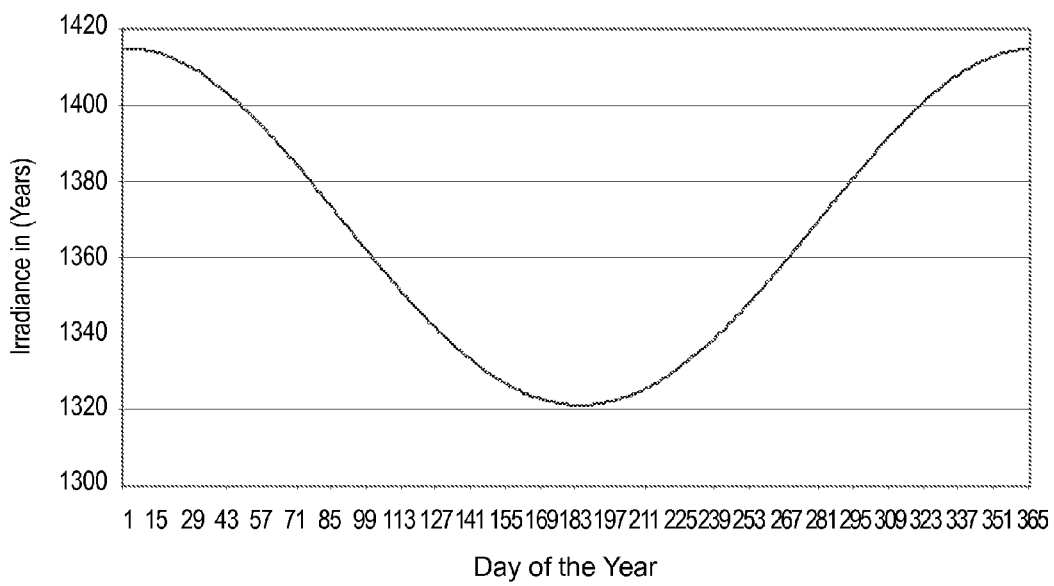
FIG. 2 is a graph of Solar Extraterrestrial Radiation.
Figure 3:
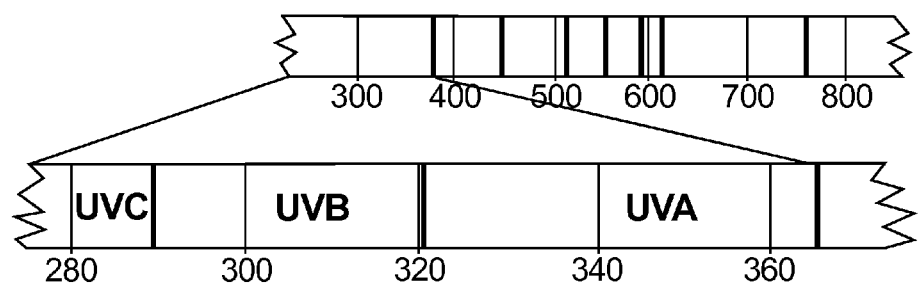
FIG. 3 shows the Ultraviolet Zone of Solar Spectrum: UVA+UVB+UVC (wavelength in nanometers).
Figure 4:
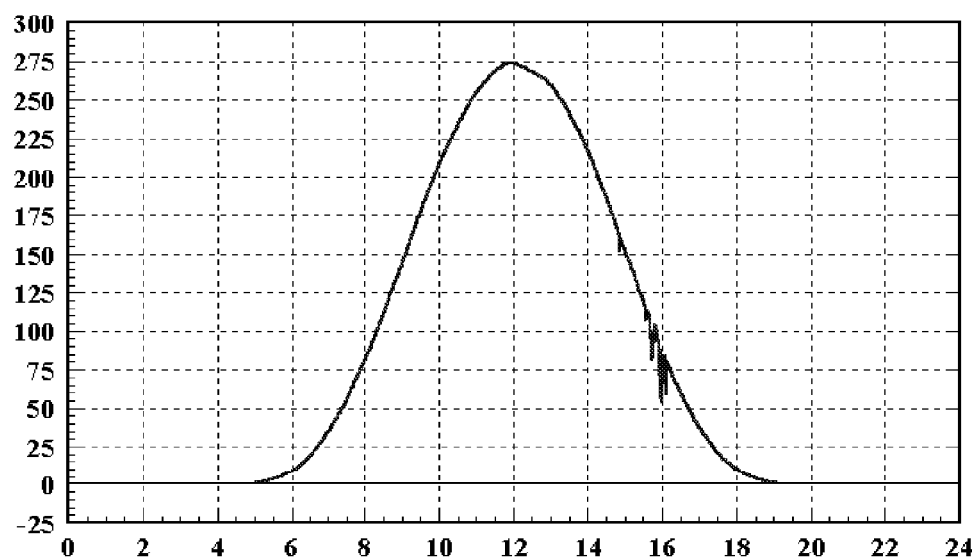
FIG. 4 is a graph showing Diurnal Variation of Ultraviolet Radiation Erithemal Dose Rate mW/m2 (ordinates), Local Solar Time (abscissas).
Figure 5:
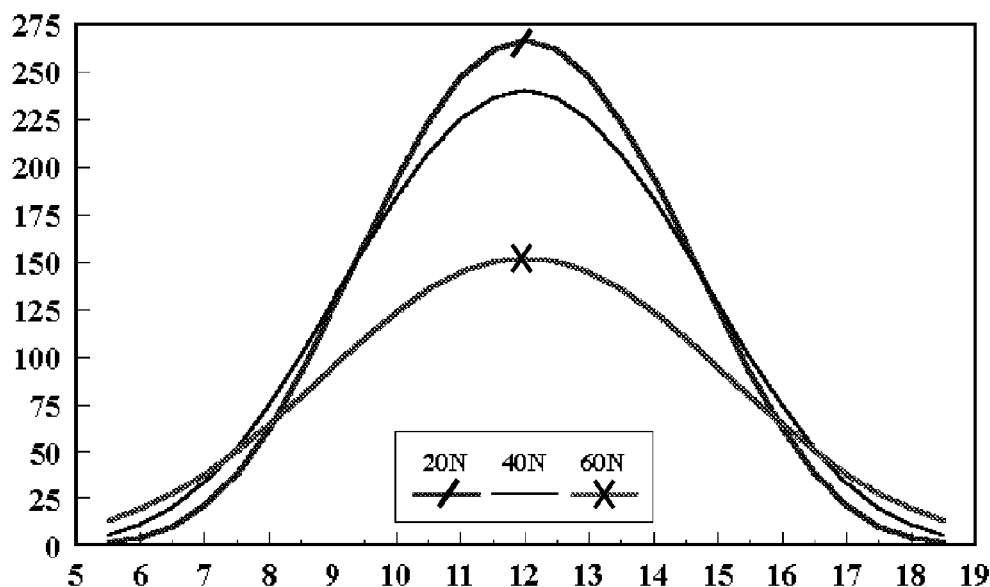
FIG. 5 shows Diurnal Erythemal Dose Rate; Ozone 300: DU Day of Year: June 22, Latitudes: 20° N, 40° N y 60° N; Erithemally Weighted Dose Rate mW/m2 (ordinates), Local Solar Time (abscissas).
Figure 6:
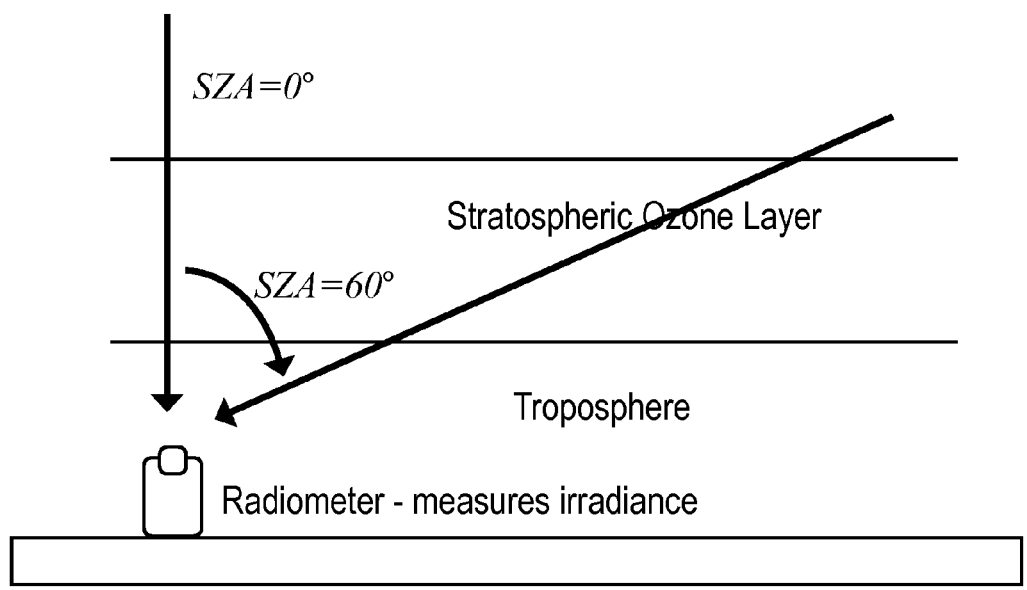
FIG. 6 shows the variation in length of the path solar radiation through stratospheric ozone layer and Sun Zenith Angle.
Figure 7:
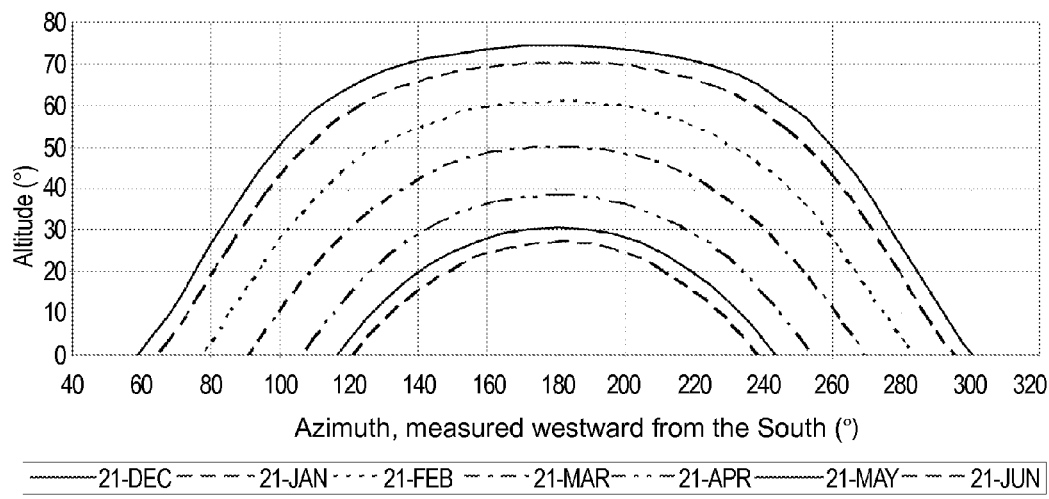
FIG. 7 shows the altitude of the Sun: diurnal variation between December solstice-June solstice.

The intensity of UV solar radiation in a particular place and time depends of factors such as the zenithal distance of the Sun, the stratospheric ozone layer, the presence of clouds, the latitude of the place, the altitude above sea level and the ground reflection. The zenithal distance of the Sun, or its complement the altitude above the horizon, depends on the time of the day (diurnal variation), the time of the year (annual variation) and the latitude of the place (FIG. 7).

There is a strong correlation between the intensity of UV radiation and the altitude of the Sun above the horizon and this may be used to design and build an instrument capable of indicating in some way the risk of ultraviolet radiation. The UVRI takes into account the parameters mentioned above: time of day, season of the year and latitude. It indicates the possibility of risk of ultraviolet solar radiation from the Hour Angle and Declination of the Sun and the Latitude of the place, variables that define the altitude of the Sun.

The design and construction of a UV RISK INDICATOR resembles a sundial but for other purposes. Basically it consists of a dial and a shadow projection device (polar or straight style) consisting of a rod or a triangular shape.

The invention works with the diurnal apparent motion of the Sun (retrograde) and it is calculated from the transformation of the Hour Coordinates of the Sun (Hour Angle and Declination) in 3D Cartesian Coordinates System. The origin of this rectangular system is the tip of the style (polar or straight). A matrix calculation is used to produce rotations of the system that take into account the latitude of the place, the orientation (declination) and the inclination of the dial plane.

The tip of the style is the focus of projection or point of view of a gnomonic projection, where the "point" of space to be projected is the Sun, the projection plane is the dial and the projected point is the tip of the style's shadow, and the x, y coordinates of the "shadow point" are calculated.

The angle of a polar style and the horizon is equal to the latitude. The distance from the tip of the polar style to the dial is the length of the straight or perpendicular style and it is a scale factor. The scale factor is set according to the size of the dial.

If the dial is a vertical plane (i=90°), the advisable orientation of a dial in Southern Hemisphere is North (d=180°) for latitudes greater than 23.44° S (Tropic of Capricorn), and South (d=0°) for latitudes between 23.44° S and 0° (Equator). For the Northern Hemisphere, the dial should be oriented towards the South (d=0°) for latitudes higher than 23.44° N (Tropic of Cancer), and towards the North (d=180°) for latitudes between 0° and 23.44° N.

The dial is considered to be flat, but it could also be of another type of surface. Similarly, its inclination and declination can be different from those listed above and it is possible to choose the most suitable in terms of latitude of the place, visibility and location of the instrument.

It is necessary to calculate hour lines for the dial (true solar time), lines of declination of solstices and equinoxes and the position of the shadow point cast by the style on the dial. The hour lines are concurrent to the point of fixation of a polar stylus. The declination lines are conics (circle, ellipse, parabola, hyperbola or straight line if the declination of the Sun is zero on the equinoxes).

The diurnal variation of altitude of the Sun causes a movement of the shadow cast by the style on the dial. As the day goes by, the shadow of the style will be moving through areas of different colors on the dial delimited by hour lines. Each color represents a different risk degree of UV solar radiation that will increase after sunrise, reaching its maximum point when the projection of the shadow is in the center of the dial (solar noon) and decreasing in the evening until sunset.

For an UVRI with inclination i=90°, declination d=180° and latitudes higher than 23.44° S; the diurnal variation of altitude of the Sun produces a clockwise movement of the shadow cast by the style on the dial.

Figure 8:
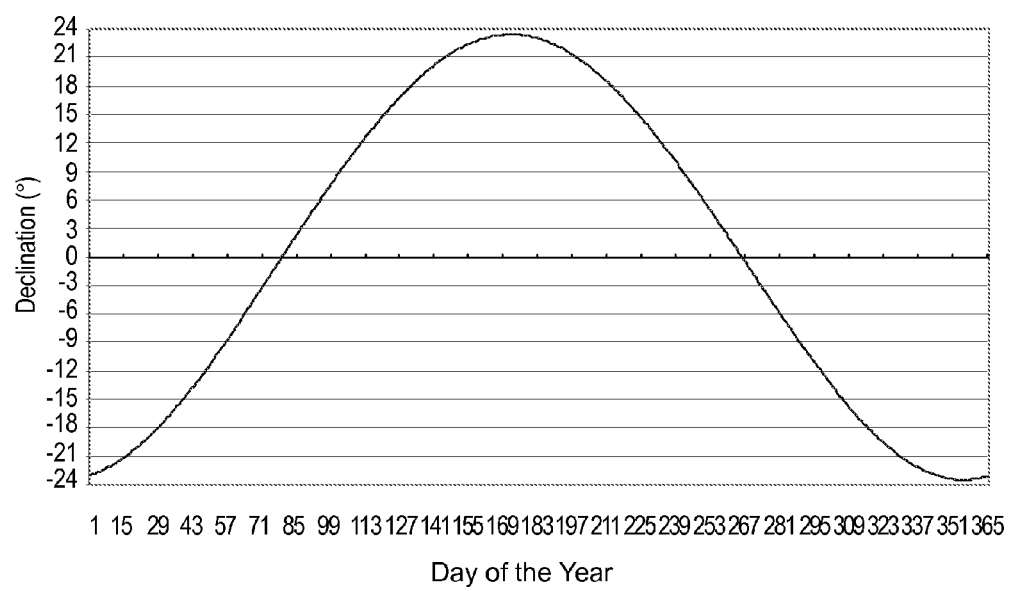
FIG. 8 shows declination of the Sun.

Since the declination of the Sun (FIG. 8) has variations throughout the year, between +23.43° (winter solstice in the Southern hemisphere or Summer solstice in the Northern Hemisphere) and −23.45° (Summer solstice in the Southern hemisphere, or Winter solstice in the Northern hemisphere), the shadow cast by the style on the dial crosses a different declination line each day of the year.

Figure 9:
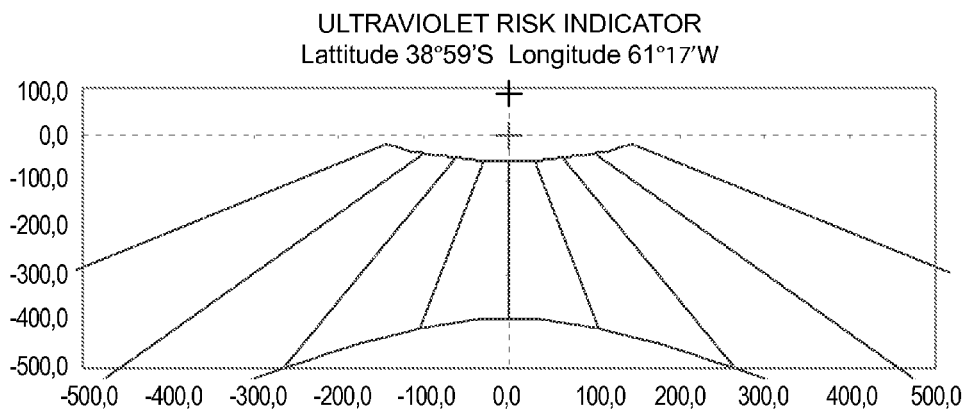
FIG. 9 is a dial design for the Southern hemisphere between June solstice (upper curve) and December solstice (lower curve)
Figure 10:
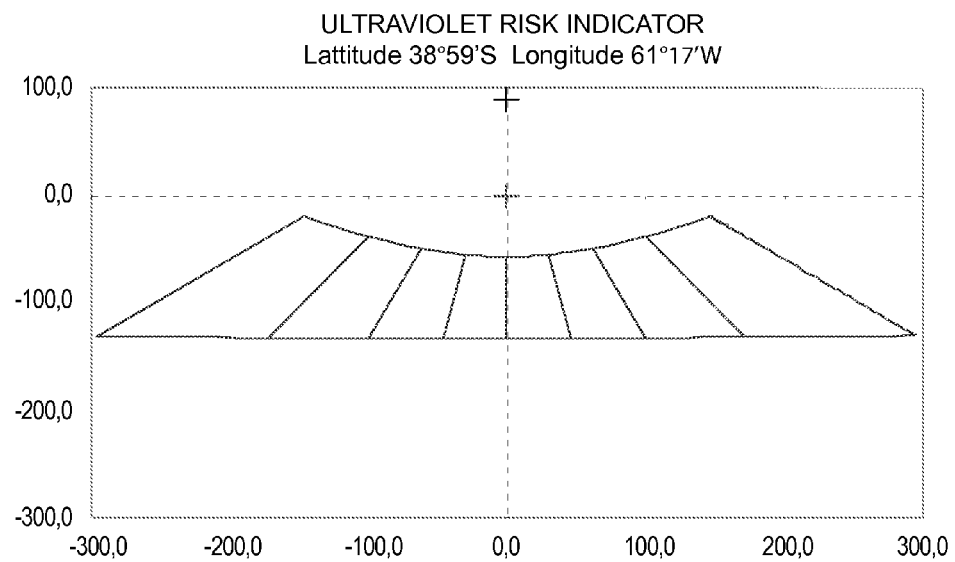
FIG. 10 is a dial design for Southern Hemisphere between June solstice (upper curve) and March/September equinox (lower curve)
Figure 11:
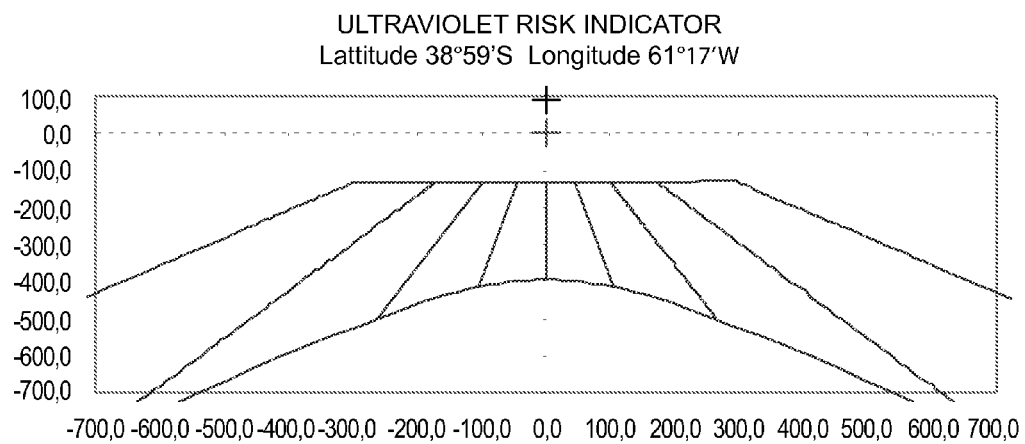
FIG. 11 is a dial design for Southern Hemisphere between March/September equinox (upper curve) and December solstice (lower curve)

The hour lines of local or true solar time, lines of declination and latitude involved in the calculations allow to delimit a UV risk area on the dial that takes into account the diurnal and annual variations of the Sun's altitude and the latitude location of the instrument (FIGS. 9, 10 and 11).

Unlike a sundial, the UV RISK INDICATOR does not indicate a time or a date. It is neither ornamental nor decorative, but an instrument of prevention or local alert for protecting human health from UV solar radiation, and it is easy to read and to interpret.

The dial of the instrument can have different configurations:
1) Hour lines and declinations in Summer and Winter solstices. Coverage throughout the year in any location (FIG. 9).
2) Hour lines and declinations in Spring/Autumn equinox and Winter solstice. It covers the period Autumn-Winter-Spring, for example in an exclusive place during Winter (FIG. 10).
3) Hour lines and declinations in a Spring/Autumn equinox and Summer solstice. It covers the Spring-Summer-Autumn period in a Summer resort. (FIG. 11).

It is also possible to take other simple settings for the dial, showing, for example, only the hour lines and the different risk areas, i.e. taking into account only the diurnal variation of altitude of the Sun, regardless of the lines of declination.

The interpretation of the dial of an ULTRAVIOLET RISK INDICATOR is easy and accessible to any adult or child. There is no need to read numbers and complicated scales, one just needs to observe the color of the sector indicated by the tip of the shadow cast by the style to know the possible UV risk at that time and place.

With a range of 4 colors (yellow, orange, red and purple) it is possible to indicate areas with different degrees of UV risk, from 08:00 to 16:00 hours of local solar time. Yellow indicates moderate UV risk; orange, high UV risk; red, very high UV risk; and purple, extreme UV risk. The colors must have a reference on the dial.

Considering the maximum altitude of the Sun reaching a certain place, the hour band may be limited to the period of the central hours between 10:00 and 14:00 h of local solar time corresponding to red (very high UV risk) and purple (extreme UV risk).

The yellow zone goes from 8:00 to 9:00 and 15:00 to 16:00; the orange area, from 9:00 to 10:00 and 14:00 to 15:00; the red zone, from 10:00 to 11:00 and 13:00 to 14:00; and the purple area from 11:00 to 13:00 hours. The hours refer in all cases to true solar time. Hour 12:00 (solar noon) coincides with the transit of the Sun. The hour values are used only for calculating hour lines limiting the different sectors.

The UVRI is governed by the apparent local time or true solar time; it does not require corrections for any changes that may occur in the time zone in a country. It works independently of civil time and daylight saving time usually adopted for many countries in the summer.

The UVRI is an instrument to indicate UV solar radiation risk in any outdoor location. Its operation is simple. It is designed based on the diurnal and annual variations of the altitude of the Sun and the latitude of the place.

The advantage of the instrument is the fact that it is simple in design and construction with different materials. It just needs Sun and the observation of the color of the sector on which the shadow is projected—polar style—or the tip of the shadow in the straight style case. It does not present any mechanical complications or require external power sources. It does not produce environmental waste contaminants or other forms of environmental degradation. The UVRI helps to preserve health and the environment.

An existing structure or a wall may be used to locate a UVRI. Previous measurement of the inclination and declination of the structure to be incorporated in the calculation is required.

2.1. Mathematical Relations Used to Design the Invention

Each instrument requires a specific calculation and its location is fixed. Even without changing the inclination and declination of the dial, the mere act of changing the latitude involved in a polar style, for example, changes the angular height, the length and the intersection with the dial.

The distance from the tip of the style (polar or straight) to the dial must be selected properly according with the dimensions to be assigned at the instrument.

2.2. Algorithms Used
2.2.1. Conversion of Gregorian Calendar Date to Julian Date $$JD=367K-<(7(K+<(M+9)/12>))/4>+<(275M)/9>+I+1721013.5+UT/24-0.5\ \text{sign}(100K+M-190002.5)+0.5$$

K year ($1801<=K<=2099$),
M month ($1<=M<=12$),
I day of the month ($1<=I<=31$)
UT universal time in hours

2.2.2. Equatorial Sun Coordinates: Right Ascension and Declination $$D=JD-2451545.0$$

D number of days and fraction (+ or −) from epoch "J2000.0" (2000 January 1.5, Julian Date 2451545.0)
JD Julian Date $$g=357.529+0.98560028D$$

$$q=280.459+0.98564736D$$

$$L=q+1.915\sin g+0.020\sin 2g$$

L approximation to the geocentric apparent ecliptic longitude of the Sun (adjusted for aberration)
The ecliptic latitude of the Sun b can be approximated by $b=0$ $$R=1.00014-0.01671\cos g-0.00014\cos 2g$$

R distance of the Sun from the Earth, in astronomical units (AU)

$$e=23.439-0.00000036D$$

e mean obliquity of the ecliptic, in degrees $$\tan RA=\cos e\sin L/\cos L$$

RA right ascension of the Sun $$\sin d=\sin e\sin L$$

d Sun declination $$EqT=q/15-RA$$

EqT Equation of Time $$EqT=\text{Apparent Solar Time}-\text{Mean Solar Time}$$

$$SD=0.2666/R$$

SD angular semi diameter of the Sun

2.2.3. Sidereal Time $$JD=JDo+H/24$$

JDo Julian Date of the previous midnight (0 h UT)
H hours of UT $$D=JD-2451545.0$$

$$Do=JDo-2451545.0$$

$$JD=2451545.0(2000\ \text{January 1, 12 h }UT)$$

$$GMST=6.697374558+0.06570982441908Do+1.00273790935H+0.000026T2$$

GMST Greenwich Mean Sidereal Time $T=D/36525$ number of centuries since the year 2000

$$GMST=18.697374558+24.06570982441908D$$

(Alternative formula with a loss of precision of 0.1 second per century)

$$GAST=GMST+eqeq.$$

GAST Greenwich Apparent Sidereal Time $$eqeq=\Delta\psi\cos\epsilon$$

eqeq equation of the equinoxes $$\Delta\psi\approx-0.000319\sin\Omega-0.000024\sin 2L$$

$\Delta\psi$ nutation in longitude $$\epsilon=23.4393-0.0000004D$$

$\epsilon$ obliquity $$\Omega=125.04-0.052954D$$

$\Omega$ Longitude of the ascending node of the Moon $$L=280.47+0.98565D.$$

L Mean Longitude of the Sun

Maximum error resulting from the use of the formulas for sidereal time over the period 2000-2100 is 0.432 seconds. RMS error is 0.01512 seconds.

Figure 12:
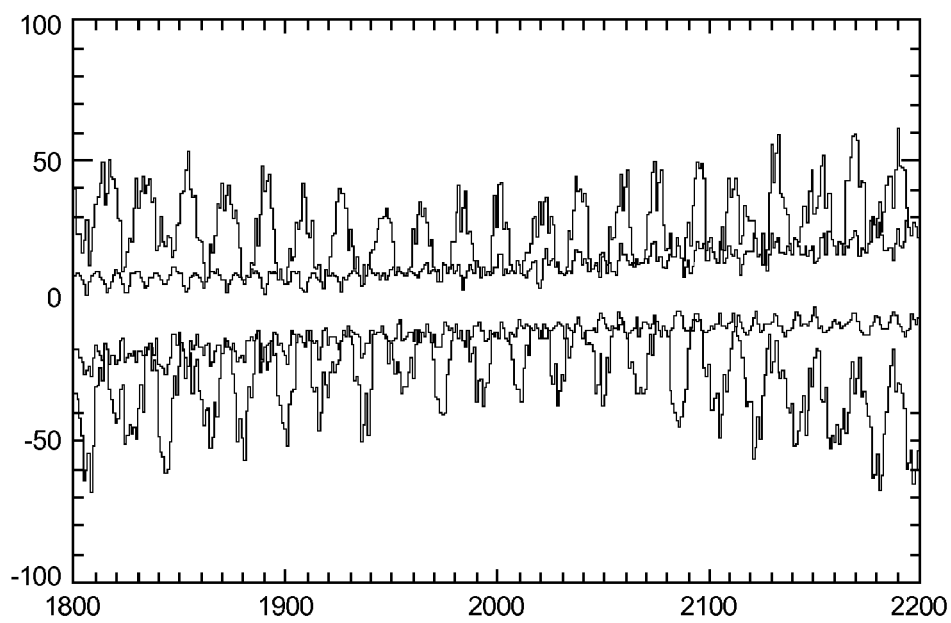
FIG. 12 shows Error in Sun Algorithm in Equatorial Coordinates—Error arcsec (ordinates), Year (abscissas)
Figure 13:
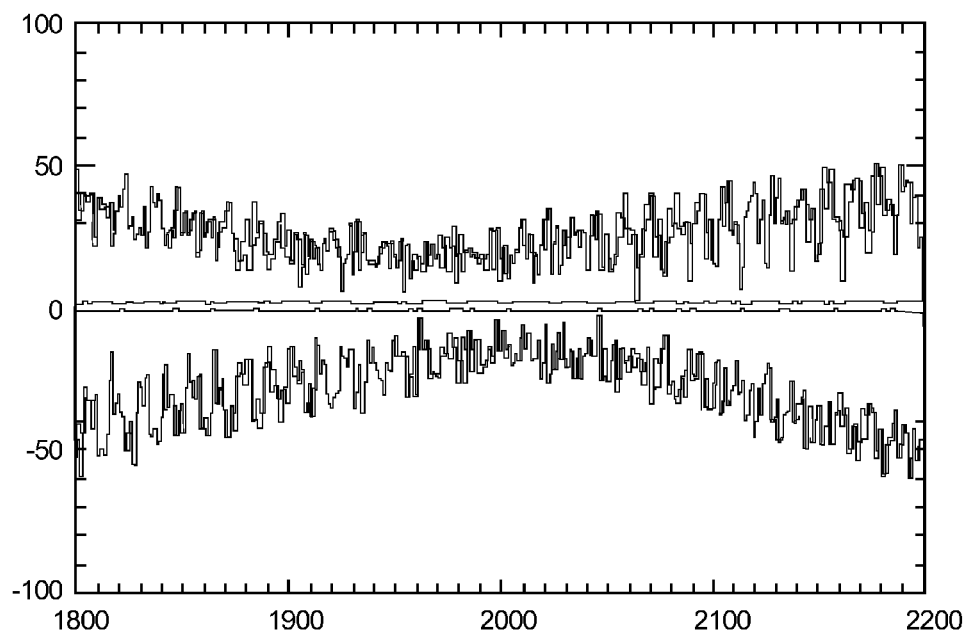
FIG. 13—Error in Sun Algorithm in Ecliptic Coordinates—Error arcsec (ordinates), Year (abscissas)

2.2.4. Horizon Coordinate System: Altitude and Azimuth $$\sin h=\sin l\sin d+\cos l\cos d\cos t\ \text{(FIG. 12)}$$

$$h=\arcsin(\sin l\sin d+\cos l\cos d\cos t)$$

h altitude
l observer latitude
d declination
t hour angle $$\tan A=\sin t\cos d/(\sin l\cos d\cos t-\cos l\sin d)$$

$$x=\sin l\cos d\cos t-\cos l\sin d$$

$$y=\sin t\cos d$$

$$A=a\tan(y/x)$$

A azimuth

The dial size of the instrument may be the most suitable for visibility, location or other reasons.

The UVRI can be located anywhere outdoors and it is ideal for crowded places, like a beach, ski resort in the mountains, recreation site, green space, country club, garden, park or square.

Maximum error resulting from the use of the formulas for sidereal time over the period 2000-2100 is 0.432 seconds. RMS error is 0.01512 seconds.

2.2.4. Horizon Coordinate System: Altitude and Azimuth $$\sin h=\sin l\sin d+\cos l\cos d\cos t\ \text{(FIG. 7)}$$

$$h=\arcsin(\sin l\sin d+\cos l\cos d\cos t)$$

h altitude
l observer's latitude
d declination
t hour angle $$\tan A=\sin t\cos d/(\sin l\cos d\cos t-\cos l\sin d)$$

$$x=\sin l\cos d\cos t-\cos l\sin d$$

$$y=\sin t\cos d$$

$$A=a\tan(y/x)$$

A azimuth

2.2.5. Sunrise and Sunset $\cos t = (\sin h - \sin l \sin d)/\cos l \cos d$ $t = \pm a \cos((\sin h - \sin l \sin d)/\cos l \cos d))$ $UT = 720 + 4(\text{longitude} - t) - EqT$ (UT in minutes)

Civil Twilight:
$h = -6°$
Sunrise and Sunset:
$h = -0.833°$
+t sunrise
−t sunset
Transit:
t=0 transit, solar noon $UT = 720 + 4*\text{longitude} - EqT$ (UT in minutes)

2.2.6. Transformation of Spherical Coordinates to Cartesian Coordinates

Figure 14:
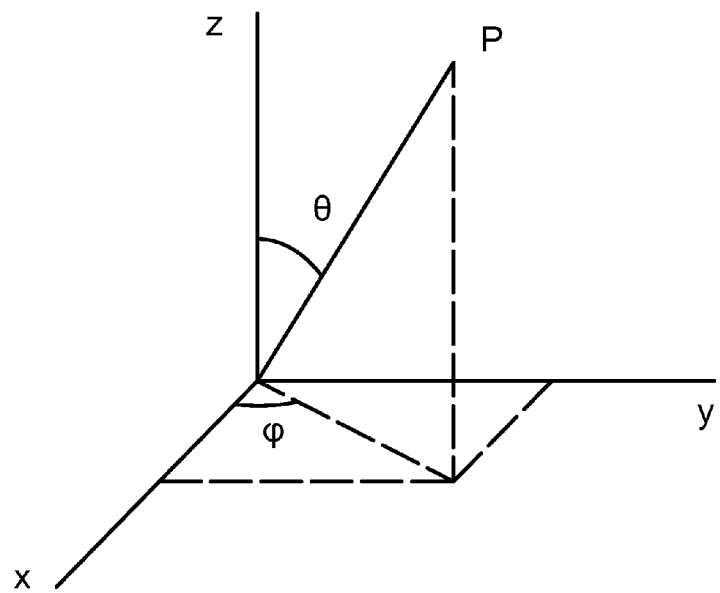
FIG. 14—Spherical and Cartesian Coordinates $0 \leq \theta \leq 180°$ $-180° \leq \phi \leq 180°$ $0 \leq r \leq \infty$ FIG. 15—Rotation $c=90-\phi$, counterclockwise direction, axis of rotation x.

FIG. 14—Spherical and Cartesian Coordinates
$0 \leq \theta \leq 180° \quad -180° \leq \phi \leq 180° \quad 0 \leq r \leq \infty$ $x = \sin\theta \cos\phi$ $y = \sin\theta \sin\phi$ $z = \cos\theta$ $r = 1$ Hour Coordinates:
d Sun declination ($-23.44° \leq d \leq 23.44°$)
t Sun hour angle ($-180° \leq t \leq 180°$, t=0 solar noon)
+t Westward
Cartesian Coordinates:

$xo = -\cos d \sin t$ $yo = -\cos d \cos t$ $zo = \sin d$

2.2.7. Rotation (90−φ)

Figure 15:
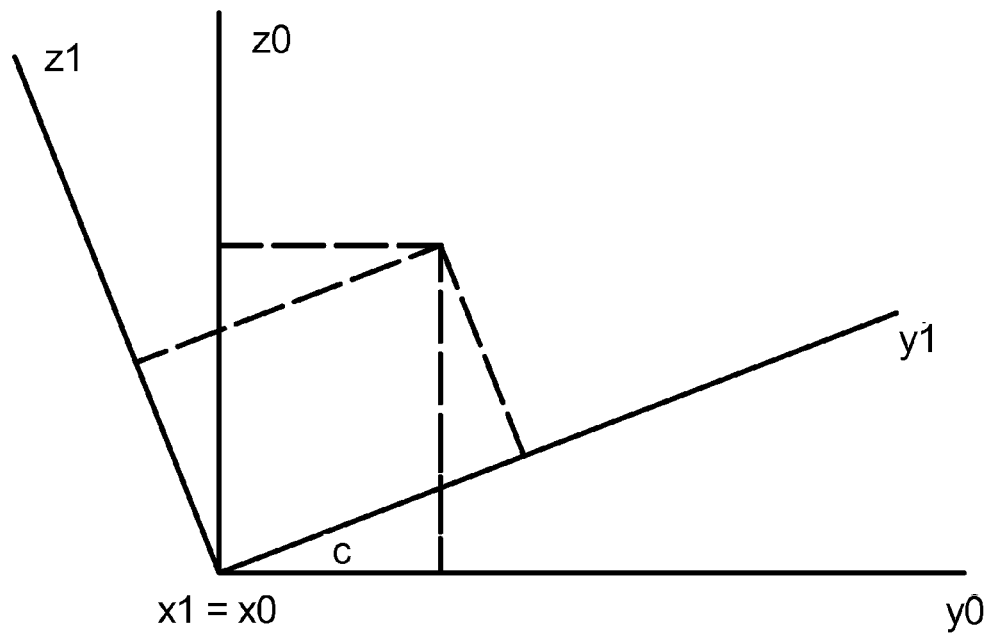

FIG. 15—Rotation c=90−φ, counterclockwise direction, axis of rotation x.
φ latitude of the place
$-90° \leq \phi \leq 90°$, +Northern Hemisphere, −Southern Hemisphere
$c = 90 - \phi$
Rotation Matrix:

$$R(x, c) \begin{Vmatrix} 1 & 0 & 0 \\ 0 & \cos c & \sin c \\ 0 & -\sin c & \cos c \end{Vmatrix}$$

2.2.8. Rotation d

Figure 16:
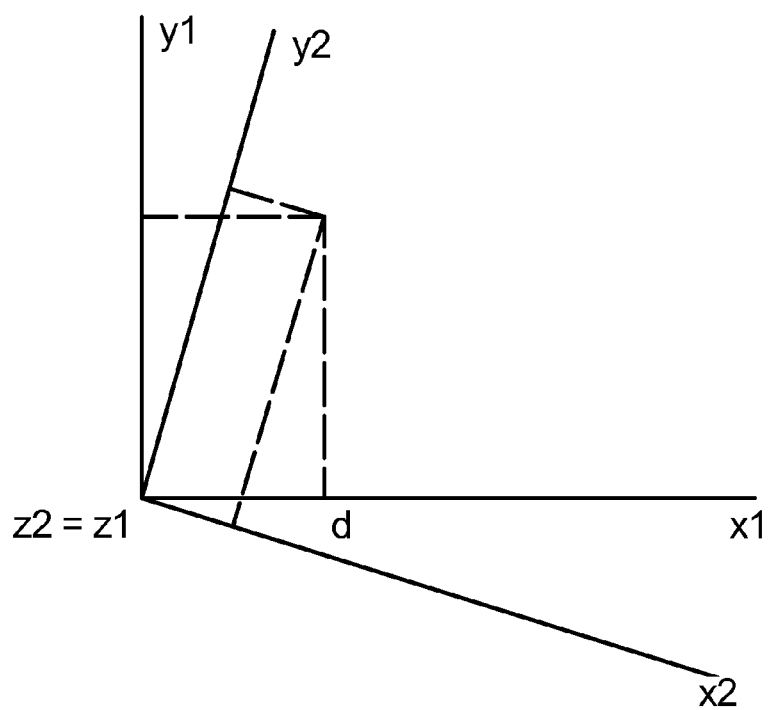
FIG. 16—Rotation d, clockwise direction, axis of rotation z.

FIG. 16—Rotation d, clockwise direction, axis of rotation z.
d declination of the dial plane, azimuth of a perpendicular to dial plane
+d Westward
$0° \leq d < 360°$
d=0° South
d=180° North
Rotation Matrix:

$$R(z, d) \begin{Vmatrix} \cos d & -\sin d & 0 \\ \sin d & \cos d & 0 \\ 0 & 0 & 1 \end{Vmatrix}$$

2.2.9. Rotation i

Figure 17:
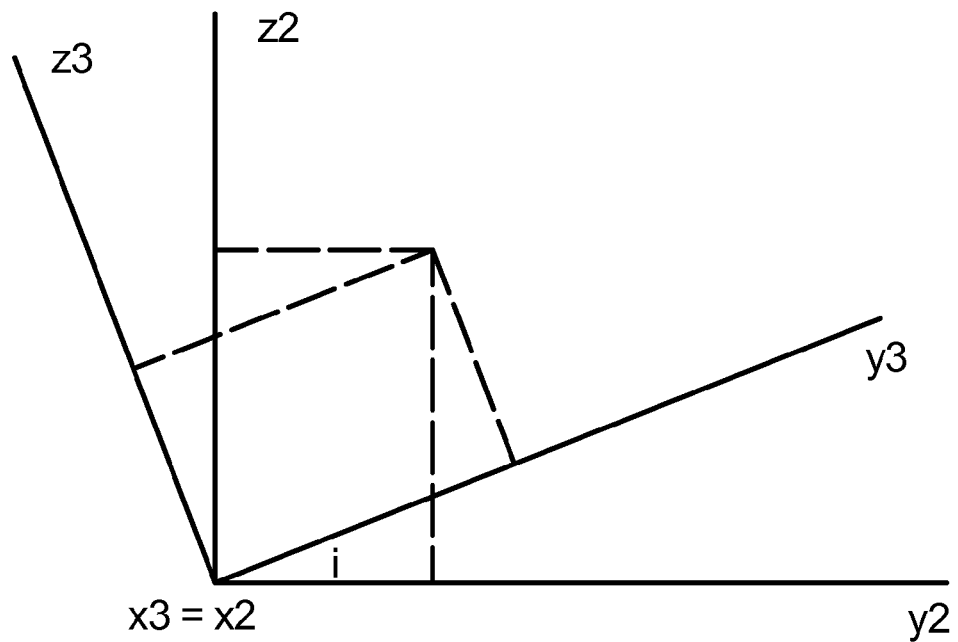
FIG. 17—Rotation i, counterclockwise direction, axis of rotation x.

FIG. 17—Rotation i, counterclockwise direction, axis of rotation x.
i inclination of the plane, zenithal distance of a perpendicular to the dial plane
$0° \leq i \leq 180°$
i=0° horizontal plane
i=90° vertical plane
Rotation Matrix:

$$R(x, i) \begin{Vmatrix} 1 & 0 & 0 \\ 0 & \cos i & \sin i \\ 0 & -\sin i & \cos i \end{Vmatrix}$$

2.2.10. Shadow Projection Device on the Dial Plane

Figure 18:
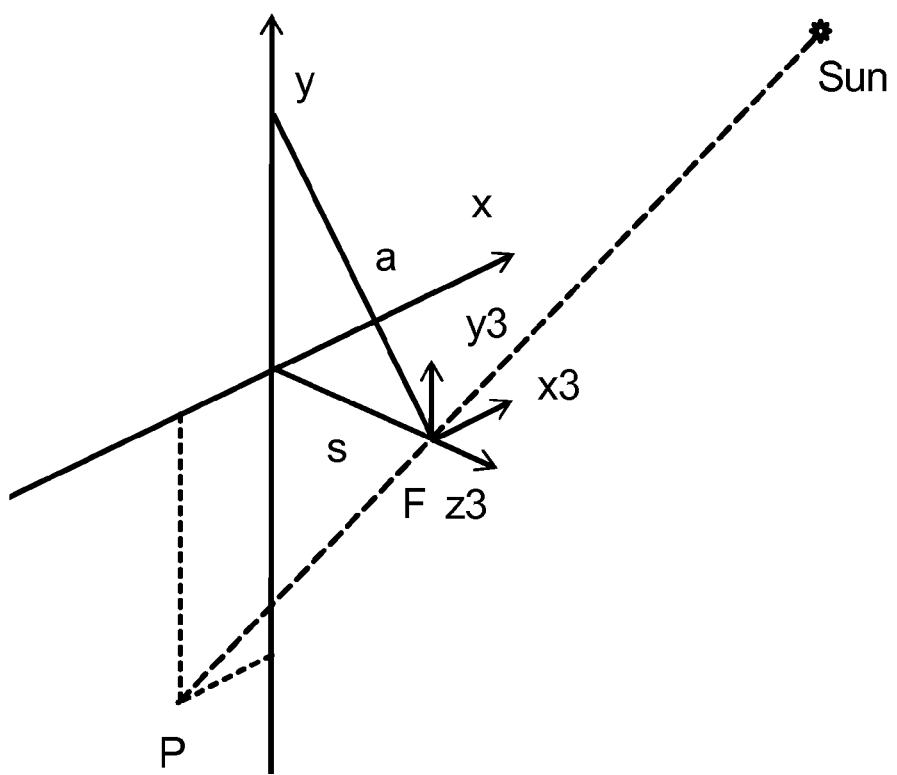
FIG. 18—Gnomonic Projection
Figure 19:
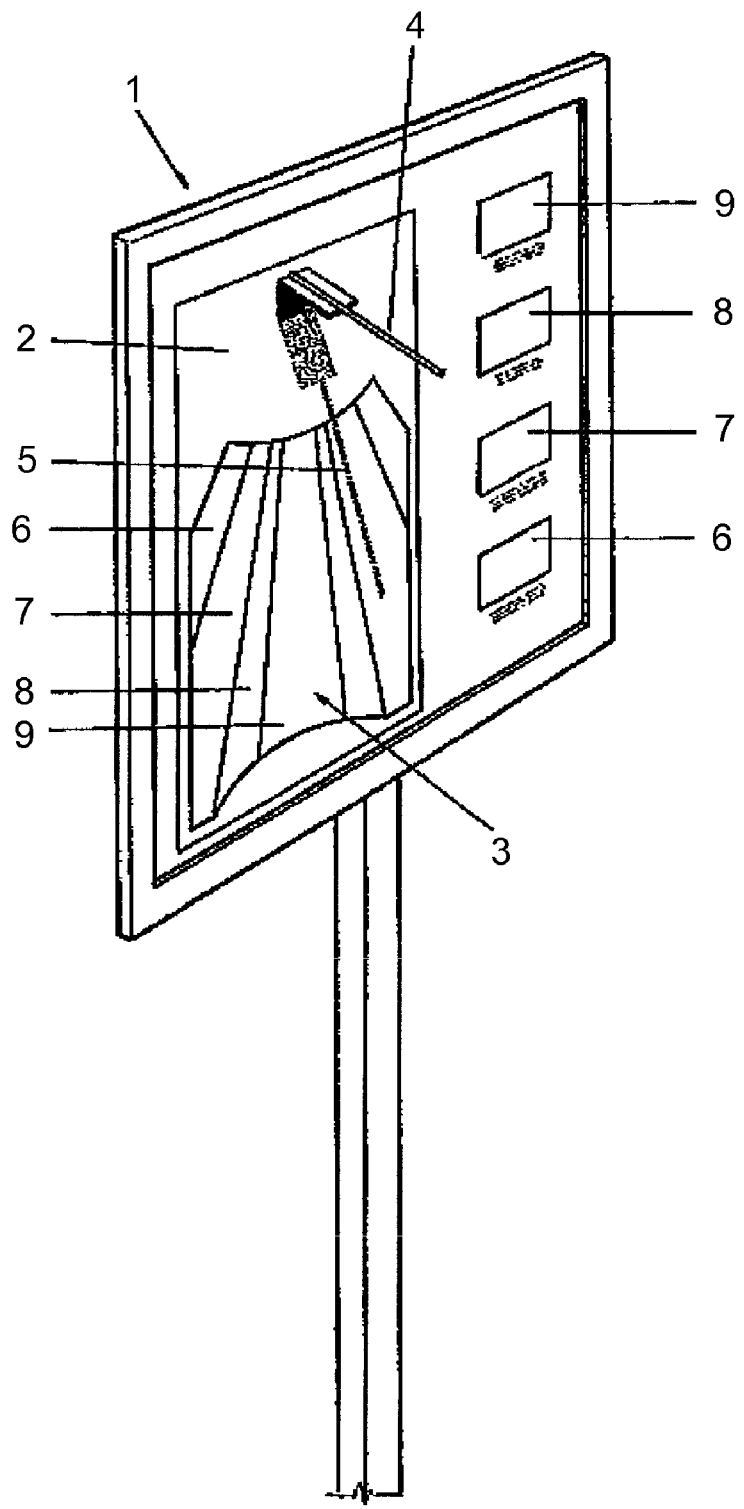
FIG. 19 is a perspective view of the UVRI used for a preferred embodiment.
Figure 20:
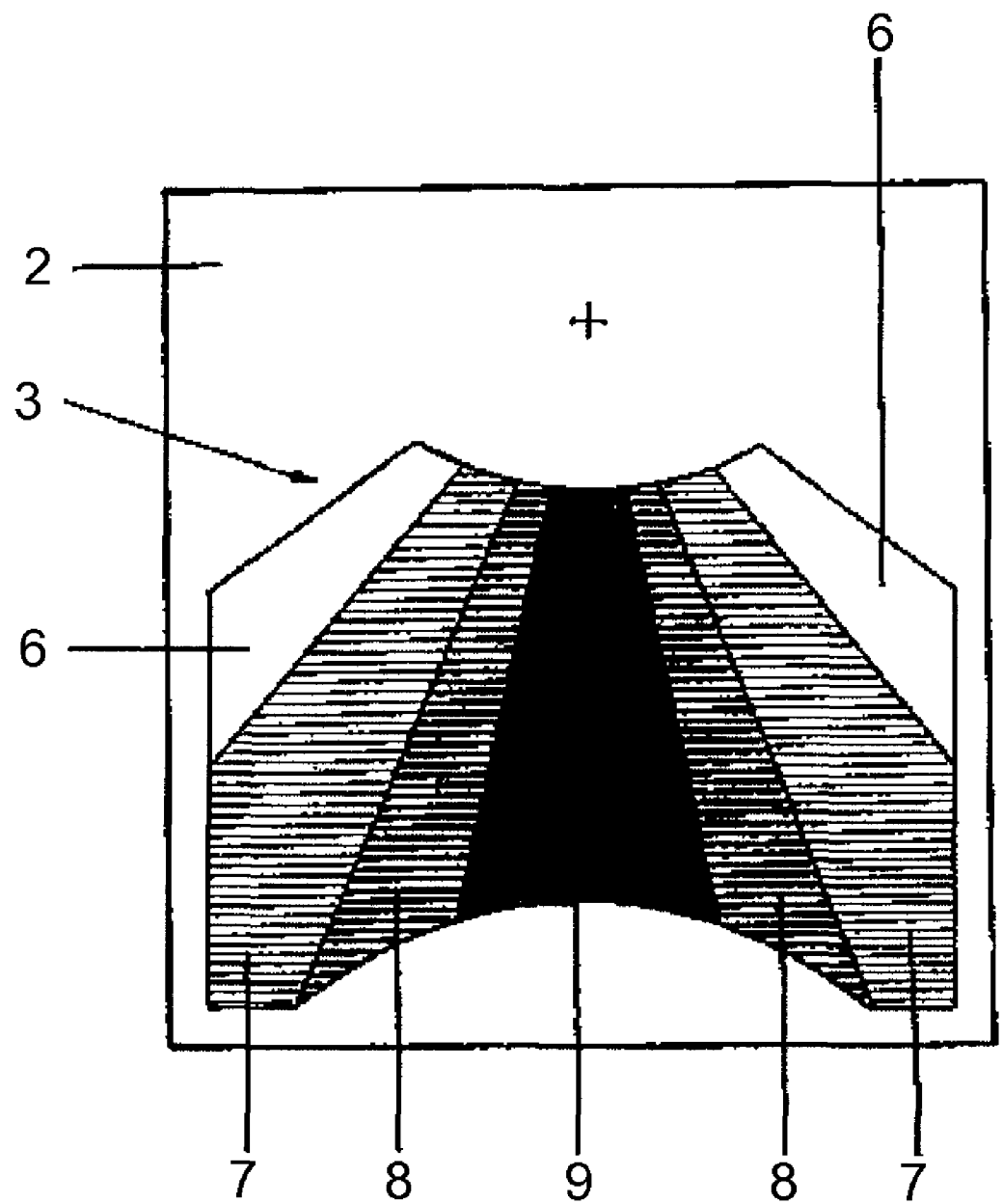
FIG. 20 is a front view of the dial.

FIG. 18—Gnomonic Projection
a>0 polar style
s straight style (height of polar style)
F tip of polar or straight style (shadow casting point)
(0,0) footprint of the straight style, origin of (x, y) system
i=0° horizontal dial
i=90° vertical dial
Cartesian Coordinates of point P on the dial plane (shadow point):

$x = -a(x3/z3)$ (x to right)

$y = -a(y3/z3)$ (y upwards)

EXAMPLES

For a better understanding of the advantages of the ULTRAVIOLET RISK INDICATOR and its constructive and functional characteristics, the following describes an example of a preferred embodiment. It illustrates schematically the drawings out of scale with reference numerals, merely illustrative purposes, it does not have a limiting nature regarding the invention. The instrument is intended to be as broad in scope as the art will permit.

The preferred embodiment comprises a panel (1) having a flat top surface upon which there is a dial (2), with a configuration (3) that was calculated based on the Hour Coordinates of the Sun (Hour Angie and Declination) in a 3D Cartesian Coordinate System. A matrix calculation was used to produce rotations of the system that take into account the Latitude of the place, the orientation (declination) and the inclination of the dial plane. The projection device in this case is a polar style—rod (4)—which is calculated and located at the point of convergence of the hour lines. The angle between the polar style (4) and the horizon is equal to the latitude of the place. The tip of the style is the focus of projection of a gnomonic projection, the point of space to be projected is the Sun, the dial is the projection plane and the projected point is the tip of the style shadow (5).

A simplification of the UVRI: in order to make it easy for people to interpret, the instrument was designed to provide graphical information, so the observer just needs to look at the right color that indicates the shadow cast by the polar style (or the tip of the shadow cast by the straight style) on the dial to know the risk degree of solar UV radiation. The different risk areas are defined by hour lines between 08:00 and 16:00 hours of true solar time and declination lines. The areas are differentiated by colors and referenced on the dial to determine the degree of UV risk in real time: yellow means moderate risk (6); orange, high risk (7); red, very high risk (8); and purple, extreme risk (9).

It is evident to a person of ordinary skill in the art that the UVRI described above may be practiced using numerous modifications and variations. It is intended to embrace all such alternatives within the sprit and scope of the appended claims.

The invention claimed is:

1. An ultraviolet risk indicator, comprising:
   a rigid panel having a surface with a dial configuration based upon location, wherein
   said dial is bounded by solar hour lines and lines of declination (solstices or equinoxes) forming distinct zones of solar UV radiation risk which depend on the altitude of the Sun;
   said dial configuration was designed for the location based on a transformation of the hourly coordinates of the Sun (hour angle and declination) in a 3D Cartesian Coordinate System using a matrix calculation to produce necessary rotations of the system, taking into account the latitude of the location, declination, and inclination of the dial,
   wherein calculated solar hour lines and lines of declination define the dial and delimit a risk area of UV radiation between 08:00 and 10:00 hours of true solar time, and
   a projection device with either a polar style parallel to the rotational axis of the Earth, or a straight style perpendicular to the dial having a rod or triangular shape,
   said projection device being located at a point of convergence of hour lines if a polar style, or at the origin of coordinates if a straight style, and whose tip is the focus of projection of a point in space that is the Sun.

2. The ultraviolet risk indicator of claim 1, wherein the projection device has a polar style forming an angle with the plane of the horizon equal to the latitude of the location, being in practice an appropriate orientation (declination) of the dial: toward North (d=180°) for latitudes of the Southern Hemisphere greater than 23.44° S (Tropic of Capricorn) and toward South (d=0°) for latitudes between 23.44° S and 0° (Equator), whereas for the Northern Hemisphere the dial is oriented towards the South (d=0°) to latitudes greater than 23.44° N (Tropic of Cancer) and North (d=180°) for latitudes between 0° and 23.44° N.

3. The ultraviolet risk indicator of claim 1, wherein an observer can see a warning in real time of the risk degree of solar ultraviolet radiation in the form graphic information by means of coded colors, in which one just needs to identify the color shown by the style shadow on the dial between 08:00 and 16:00 hours of true solar time to see the UV solar radiation risk.

4. The ultraviolet risk indicator of claim 3, wherein the colors are yellow for moderate risk, orange for high risk, red for very high risk, and purple for extreme risk.

5. The ultraviolet risk indicator of claim 1, which provides a real time warning to an observer in the form of simplified graphic information limited to the UV high risk areas ranging from 10:00 to 14:00 hours of true solar time, being 2 hours before and 2 hours after solar noon, with the risk area defined by lines of declinations (solstices and equinoxes), and sectors of the dial in different colors.

6. The ultraviolet risk indicator of claim 5, wherein red indicate very high risk and purple indicates extreme risk.

7. An ULTRAVIOLET RISK INDICATOR consists of a panel of a rigid material with a dial mounted on a support, characterized by a panel (1) having a flat top surface upon which there is a dial (2) made with a configuration (3), the dial is bounded by solar hour lines and lines of declination (solstices or equinoxes), forming distinct zones of solar UV radiation risk depending on the altitude of the Sun, whose arrangement (3) was calculated based on the transformation of the hourly coordinates of the Sun (hour angle and declination) in a 3D Cartesian Coordinate System which used matrix calculation to produce the necessary rotations of the system, that takes into account the latitude of the place, the declination and the inclination of the dial, having also calculated solar hour lines and lines of declination, elements that define the dial and delimit between 08:00 and 10:00 hours of true solar time a risk area of UV radiation, and a projection device with a polar style parallel to the rotation axis of the Earth or a straight style perpendicular to the dial, consisting of a rod (4) or a triangular shape, which is located at the point of convergence of hour lines in the case of a polar style or the origin of coordinates in the straight style case, and whose tip is the focus of projection of a point in the space that is the Sun, forming in the case of a polar style (4) with the plane of the horizon an angle equal to the latitude of the place, being in the practice an appropriate orientation (declination) of the dial: toward North (d=180°) for latitudes of the Southern Hemisphere greater than 23.44° S (Tropic of Capricorn) and toward South (d=0°) for latitudes between 23.44° S and 0° (Equator), while for the Northern Hemisphere the dial should be oriented towards the South (d=0°) to latitudes greater than 23.44° N (Tropic of Cancer) and North (d=180°) for latitudes between 0° and 23.44° N.

8. An ULTRAVIOLET RISK INDICATOR of clam 7, characterized by an exclusive feature of the instrument that makes it possible to any observer to be able to observe the warning in real time of the risk degree of solar ultraviolet radiation in the form graphic information by means of coded colors, thus one just needs to identify the color shown by the style shadow on the dial between 08:00 and 16:00 hours of true solar time to find out the UV solar radiation risk at that instant. The colors are: yellow, for moderate risk (6); orange, for high risk (7); red, for very high risk (8); and purple, for extreme risk (9).

9. An ULTRAVIOLET RISK INDICATOR of claim 8, characterized by considering a simplification of the instrument the fact that makes it possible to provide a real time warning to the observer in the form of graphic information limited to the UV high risk areas, ranging from 10:00 to 14:00 hours of true solar time, for 2 hours before and 2 hours after solar noon, with the risk area also defined by lines of declinations (solstices and equinoxes), and sectors of the dial of different colors, in this case red for very high risk (8) and purple for the extreme risk (9).

* * * * *